Sept. 27, 1932.  P. BROSSE  1,879,061
DEVICE FOR THE CUTTING OF THREADS ON CYLINDRICAL SURFACES
Filed March 31, 1931
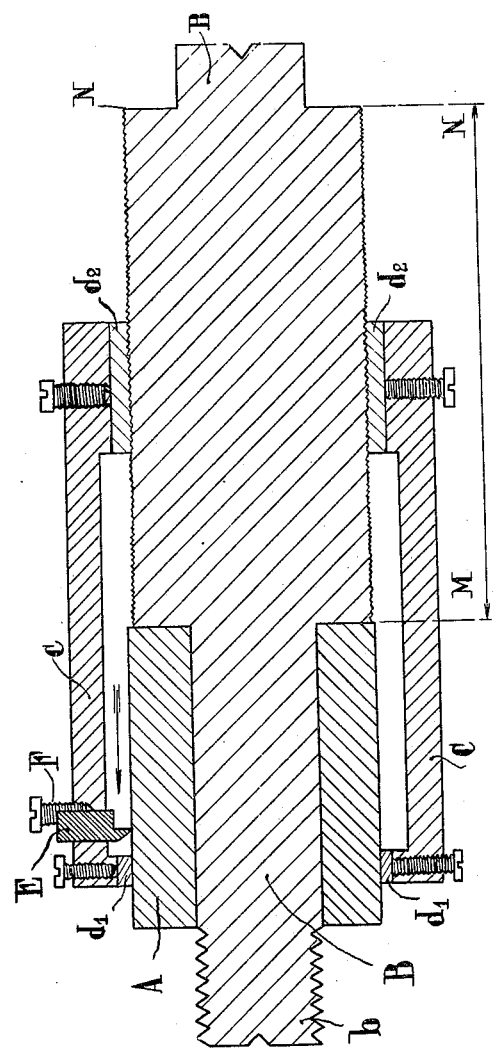
INVENTOR:
Paul Brosse
BY
ATTORNEY Patented Sept. 27, 1932

1,879,061

UNITED STATES PATENT OFFICE

PAUL BROSSE, OF NEUILLY-SUR-SEINE, FRANCE, ASSIGNOR TO KISLYN CORPORATION,
A CORPORATION OF DELAWARE

DEVICE FOR THE CUTTING OF THREADS ON CYLINDRICAL SURFACES

Application filed March 31, 1931, Serial No. 526,734, and in France April 2, 1930.

The goffering of films by rolling puts a difficult mechanical problem, viz.: the production of threads of the order of 30 threads to the millimeter, perfectly regular, without any periodicity, having a well-defined outline and the depth of which is of the order of three-thousandths of a millimeter.

A constant outline is obtained by means of a shaping tool made of a very hard material, e. g. carborundum, diamond, etc. As to the other qualities to be obtained for the engraving, they can be arrived at technically with the aid of the device described hereinafter which avoids all the defects resulting from screw-cutting laths and above all from expansions in the mechanical parts, which expansions are of the same order as the depth of the cuts to be obtained.

The principle applied in connection with the device considered is the templet method of threading, that is, a threading process wherein the leading screw has the same pitch as the thread to be produced. Moreover, it is necessary that any gear transmission should be done away with if periodical defects similar to what is called "reproduction" on ordinary lathes are not to be encountered.

The single figure of the drawing shows the structure in cross section taken on the axis of the cylinder to be threaded.

Let A be the (hollow) cylinder to be machined by marking on the outer surface thereof a thread having a pitch corresponding e. g. to 30 threads to the millimeter. The cylinder is mounted on a shaft B which is trued perfectly and displays the following peculiarities:—

The shaft is formed at the end $b$ thereof with a substantial thread (on which a nut is to be screwed by means of which the cylinder A is clamped on the shaft B). The other end of the shaft has about the same diameter as the cylinder A and is formed at the portion M-N thereof with a very fine pitch thread, e. g. 30 cuts to the millimeter, where such a thread is to be produced. The portion M-N of the shaft B provides the templet.

A tube or sleeve $c$ provided with adjustable bearing blocks $d_1$ and $d_2$ encloses the whole structure, the blocks $d_1$ engaging the cylinder A while the blocks $d_2$ engage the templet M-N on shaft B. Received in the wall of the tube $c$ is a tool-holder E which can be adjusted by means of a micrometric screw F and is perfectly guided in its housing. The said tool-holder is located as close to the blocks $d_1$ as possible in order to avoid bending or expansion effects.

The operation now is as follows:—

The tube $c$ is traversed towards the end N of the templet cut on shaft B the bearing blocks $d_2$ are clamped so as to become impressed with the threads on the templet; the bearing blocks $d_1$ then are pressed upon the perfectly trued surface of the cylinder A; finally, the cutting depth of the tool $g$ is adjusted by means of the micrometric screw F. Now, to thread the cylinder A it is only necessary to cause the shaft B to rotate with respect to the tube $c$, or the tube $c$ with respect to the shaft B.

Such work can be performed either by hand or with the aid of any suitable mechanical transmission.

By using suitable cutting tools it is possible to engrave cylinders made of hardened steel, glass, etc. Using burnishing tools will allow softer surfaces to be machined and polished groove bottoms to be obtained on steel, tempered nickel, silver, etc.

Having now particularly described and ascertained the nature of our said invention and in what manner the same is to be performed, we declare that what we claim is:—

1. In combination, a shaft having a lead thread thereon, a work support integral with said shaft and extending axially thereof, means for securing a piece of work in the form of a cylinder on said support, a tool holder having a bearing in threaded engagement with said lead thread and having a second bearing adapted to engage the work on said support, and a cutting tool on said holder between said bearings and adapted to cut a thread in said work upon relative rotation between the shaft and holder.

2. In combination, a shaft having a lead thread thereon, a work support integral with said shaft and extending axially thereof, means for securing a piece of work in the form of a cylinder on said support, a tool holder in the form of a sleeve surrounding part of the shaft and work, a threaded bearing block on the inside of said sleeve and engaging said lead thread, a second bearing block on the inside of the sleeve and adapted to engage the work on said support, and a cutting tool on said sleeve between said bearings and adapted to cut a thread in said work upon relative rotation between the shaft and holder.

3. In combination, a shaft having a lead thread thereon and having an end portion separated from the thread by a shoulder, said end portion being adapted to support a cylindrical piece of work thereon, means to secure such a piece of work on said end portion, a tool holder having a bearing in threaded engagement with said lead thread and a second bearing adapted to engage said work, and a cutting tool on said holder between said bearings and adapted to cut a thread in said work upon relative rotation between the shaft and holder.

In testimony whereof I affix my signature.

PAUL BROSSE.